United States Patent
Bonello

(10) Patent No.: US 6,268,860 B1
(45) Date of Patent: Jul. 31, 2001

(54) IMAGING METHOD AND APPARATUS FOR EXECUTING THE METHOD

(75) Inventor: Burckhardt Bonello, Bergfelde (DE)

(73) Assignee: GMD-Forschungszentrum Informationstechnik GmbH, Sankt Augustin (DE)

(*) Notice: Subject to any disclaimer, the term of this patent is extended or adjusted under 35 U.S.C. 154(b) by 0 days.

(21) Appl. No.: 09/054,462

(22) Filed: Apr. 3, 1998

(30) Foreign Application Priority Data

Apr. 3, 1997 (DE) .............................. 197 14 915

(51) Int. Cl.$^7$ .................................. G06T 17/00

(52) U.S. Cl. ............................................. 345/426

(58) Field of Search .................... 345/426, 418, 345/419, 424, 425

(56) References Cited

U.S. PATENT DOCUMENTS

| | | | | |
|---|---|---|---|---|
| 4,928,250 | * | 5/1990 | Greenberg et al. | 345/426 |
| 5,031,117 | * | 7/1991 | Minor et al. | 345/426 |
| 5,043,922 | * | 8/1991 | Matsumoto | 345/426 |
| 5,377,313 | * | 12/1994 | Scheibl | 345/426 |
| 5,555,352 | * | 9/1996 | Lucas | 345/426 |
| 5,880,736 | * | 3/1999 | Peercy et al. | 345/426 |
| 5,886,701 | * | 3/1999 | Chauvin et al. | 345/418 |
| 5,933,146 | * | 3/1999 | Wrigley | 345/426 |
| 5,977,977 | * | 11/1999 | Kjiya et al. | 345/418 |

FOREIGN PATENT DOCUMENTS

| | | |
|---|---|---|
| 0366463 | 5/1990 | (EP) . |
| 2246497 | 1/1992 | (GB) . |

OTHER PUBLICATIONS

"Reflection Vector Shading Hardware" by Douglas Voorhies & Jim Foran. Computer Graphics Proceedings, Annual Conference Series, 1994, pp. 163–6.

"Illumination for Computer Generated Picture" by B.T. Phong Communications of the ACM, Jun. 1975, vol. 18, No. 6, pp. 311–7.

"A Real Time Rendering System with Normal Vector Shading" by D. Jackél & H. Rüsseler. 9th Eurographics Workshop on Graphics Hardware, Oslo Norway. pp. 48–56.

* cited by examiner

Primary Examiner—Cliff N. Vo
(74) Attorney, Agent, or Firm—Venable; George H. Spencer; Robert Kinberg

(57) ABSTRACT

In an imaging method and apparatus for displaying computer-modeled objects present in the form of a grid model, in which the objects are defined by the coordinates of the node points of the grid model and the optical properties of the polygon surfaces between the node points, and the individual polygon surfaces are divided into a plurality of scanlines and pixels. The image impression is calculated in only a portion of the pixels according to a local illumination model, or a portion of a local illumination model, and is interpolated in the remaining pixels from the previously-calculated image-information values for reducing the calculation effort.

16 Claims, 5 Drawing Sheets

IMAGING METHOD AND APPARATUS FOR EXECUTING THE METHOD

CROSS-REFERENCE TO RELATED APPLICATION

This application claims the priority of Patent Application Ser. No. 197 14 915.4, filed Apr. 3, 1997, in the Federal Republic of Germany, the subject matter of which is incorporated herein by reference.

BACKGROUND OF THE INVENTION

The present invention relates to an imaging method and apparatus for displaying computer-modeled objects present in the form of a grid model, in which the objects are defined by the coordinates of the node points of the grid model and the optical properties of the polygon surfaces between the node points, and the individual polygon surfaces are divided into a plurality of scanlines and pixels. The image impression is calculated in only a portion of the pixels according to a local illumination model, or a portion of a local illumination model, and is interpolated in the remaining pixels from the previously-calculated image-information values for reducing the calculation effort.

In computer-graphics systems, objects are usually simulated with grid models, in which the objects are defined by the spatial coordinates of the node points of the grid model and the optical properties, such as the color and reflection behavior, of the polygon surfaces between the node points. Computer-graphics systems of this type are known from, for example, VOORHIES, D.; FORAN, J.: Reflection Vector Shading Hardware, SIGGRAPH '94, and JACKÈL, D.; Rüsseler, H.:A Real Time Rendering System with Normal Vector Shading; 9th Eurographics Workshop on Graphics Hardware, Oslo (Norway), 1994. To calculate the image impression, the individual polygon surfaces are divided into pixels, and the spatial coordinates and the spatial position of the local surface normal, which are decisive for the reflection behavior and thus the impression of the image, are calculated for each pixel. With an inclination of the local surface normal inside the polygon surface, for example, it is also possible, on the one hand, to simulate curved polygon surfaces, so a smooth and thus visually inconspicuous transition can be attained at the edges between adjacent polygon surfaces. On the other hand, it is also possible to simulate rough textures in this manner by inclining the local surface normal inside the respective polygon surface to correspond to the desired texture, which is also referred to as bumpmapping. After the spatial coordinates of the individual pixels and the respective local surface normal have been calculated, the image impression is calculated individually for each pixel, according to a local illumination model; the perspective of the viewer, the spatial position and the optical properties of the pixel, the orientation of the local surface normal and the spatial position and optical properties of the light sources that illuminate the objects are all considered.

Typically, the illumination model used to calculate the image impression of the individual pixels is the one described in PHONG: Illumination for Computer Generated Pictures; Communications of the ACM, 18(6):311–317, June 1975, which has also been incorporated into the quasi-industry standard OpenGL. This illumination model advantageously permits the consideration of numerous optical effects, such as ambient, diffuse and specular reflection, and thus produces a very realistic image impression.

A disadvantage of the known imaging methods based on a local illumination model is the relatively large amount of calculation effort. In a software-based solution, the serial processing of the calculation steps increases the time span necessary for calculating an image, which hinders a real-time display of representations of movement, particularly with complex illumination relationships. In a hardware-based solution, the increased calculation effort can be overcome with a plurality of pipelines operating in parallel, but this arrangement is associated with a larger chip surface.

SUMMARY OF THE INVENTION

It is therefore the object of the invention to provide an imaging method of the above-described type and an apparatus for executing the method, in which the image impression is calculated according to a local illumination model, and the calculation effort is reduced, so the imaging method can also be executed with relatively simple hardware, or even complex scenes with a plurality of light sources can be calculated sufficiently quickly.

The object is accomplished by providing an imaging method and apparatus for displaying computer-modeled objects that are present in the form of a grid model and are simulated by a plurality of adjacent polygon surfaces, in which a first assembly of a calculation unit calculates a plurality of first coordinate sets from a first parameter set that respectively represents the spatial position of one of the polygon surfaces, the coordinate sets respectively representing the spatial position of a pixel of the respective polygon surface, a second assembly of the calculation unit uses the first parameter set representing the spatial position of the polygon surface to calculate a second coordinate set for each pixel of the polygon surface, which set represents the spatial position and direction of the local surface normal, a third assembly of the calculation unit uses a second parameter set representing the spatial position and the optical properties of at least a first light source, as well as the first coordinate sets representing the spatial position of the individual pixels, and the second coordinate sets representing the spatial position of the local surface normals, to calculate image-information values according to a local illumination model, the values representing the image impression of a respective pixel, and a fourth assembly of the calculation unit uses the first coordinate set representing the spatial position of the respective pixel to calculate a two-dimensional screen-coordinate set for each pixel for display on the screen, which set determines the position of the pixel on the screen. A first portion is selected from all of the pixels of the respective polygon surface, and the third assembly calculates of the image-information values for all of the pixels of the first portion according to the local illumination model or a portion of the local illumination model, and subsequently a fifth assembly uses the image-information values that have been calculated for the first portion of pixels to interpolate the image-information values for a second portion of pixels that includes the remaining pixels of the polygon surface.

The invention includes the technical teaching of calculating the image impression for only a portion of the pixels within a polygon surface, according to a local illumination model, for saving calculation time and/or reducing the hardware prerequisites, and interpolating the image impression for the remaining pixels from the previously calculated image-information values.

The term "local illumination model" is not limited here or hereinafter to the aforementioned and preferably used Phong illumination model, but, in principle, also encompasses other illumination models that permit the calculation of the image impression of a pixel of a polygon surface as a function of the illumination relationships and the geometrical relationships.

The measures employed in the invention can be implemented with both purely software-based measures and suitable special hardware. Within the framework of a hardware-based solution, it is also possible to switch a plurality of so-called pipelines in parallel, in which the respective image impression of a pixel is calculated. Pipelines of this type are arithmetic and logical units comprising assemblies switched one behind the other and separated by storage elements, with a plurality of intermediate results being located in the assemblies simultaneously (in parallel) during different calculation phases. With each cycle, all of the intermediate results advance by one calculation step, so one end result can be attained per cycle. "Pipelining" of this nature can significantly shorten the time span required for calculating an image.

When "pipelines" are discussed below, they may also involve functional groups, for example in the form of electrical circuits. It may also be that one and the same assembly or functional group consecutively performs different operations, as is generally the case in processor technology. As explained above, however, speed advantages can be attained if functional groups are active adjacently and in parallel.

Within the scope of the measures of the invention for representing objects within the framework of image processing, the individual polygon surfaces are preferably divided into a plurality of parallel, equidistant scanlines, in which the pixels are in turn disposed equidistantly. The polygon surface is divided by the first assembly or functional group of a calculation unit, whose input receives a first set of parameters representing the spatial position of the polygon surface, and outputs a plurality of first sets of coordinates at its output, which set respectively represents the spatial position of a pixel. The calculation of the first parameter set for each polygon surface can be effected by a superordinate graphics system that can contain a plurality of the calculation units described here, so it is possible to calculate the image impression of a plurality of objects of a spatial scene in parallel, which drastically reduces the calculation time in complex scenes.

The calculation unit further has a second assembly that calculates a second set of coordinates for each pixel of the polygon surface, which set represents the spatial position of the local surface normal. It must be pointed out here that the local surface normal need not coincide with the surface normals of the entire polygon surface, because the polygon surface is preferably curved to attain a smooth, visually inconspicuous transition at the edges of adjacent polygon surfaces. In one possible embodiment of this variation, the surface normals at the corner points of the individual polygon surfaces are predetermined by the first parameter set representing the spatial position of the polygon surface. The local surface normal for the individual pixels of the polygon surface is calculated through interpolation of the corner-point normals, which also has the advantage that the local surface normals of adjacent polygon surfaces are identical at the common corner points, and, at most, differ only slightly along the common edge because of the interpolation, which results in an essentially smooth and thus visually inconspicuous transition between adjacent polygon surfaces.

A third assembly actually calculates the image-information values according to the local illumination model. On the input side, the third assembly receives a second parameter set, which represents the spatial position and the optical properties of at least a first light source. Hence, for each light source, the second parameter set preferably includes the spatial coordinates, the vector components of the primary beam direction, the ambient, diffuse and specular color of the light source and, if need be, a so-called spotlight-cutoff angle, which determines the cone angle of the beam cone, outside of which the light source has no intensity. Furthermore, the second parameter set can also indicate the angle-dependent attenuation of the individual light sources, for example through the presetting of an exponent for Phong's illumination model.

On the input side, the third assembly is connected to the first assembly for receiving the first coordinate set that represents the spatial position of the pixel. To receive the second coordinate set, which represents the orientation of the local surface normal, the third assembly is connected on the input side to the second assembly.

Moreover, the calculation unit has a fourth assembly, which calculates the position of each pixel on a screen as a function of the virtual perspective of the viewer. For this purpose, the fourth assembly is connected on the input side to the first assembly, and, from the first coordinate sets representing the spatial position of the individual pixels, respectively calculates a two-dimensional screen data set that represents the horizontal and vertical positions at which the respective pixel must appear inside of the screen coordinate system for generating the desired perspective.

In the calculation of the image impression for the individual pixels, an image-information value is calculated according to the local illumination model; this value represents, for example, the intensity of the three primary colors in a use of the known RGB color model. The term "image-information value" is not limited to the representation of the three primary colors according to the RGB color model, however, but also encompasses the representation of the corresponding parameters in a use of other color models, such as the CMYK color model or the HSB color model. In addition, it is possible to calculate only the gray shading of the respective pixel as an image-information value in a monochromatic representation. The only decisive factor in this case is that the image-information value reflect the image impression of the individual pixel and permit a corresponding actuation of a screen for display.

In accordance with the invention, in order to save calculation time and/or reduce the hardware prerequisites, a first portion of the pixels of the respective polygon surface is selected, for which the image-information value is calculated according to the local illumination model. A key factor for saving calculation time is that the complex calculations of the image-information value according to the local illumination model are only necessary for the first portion of the pixels. The image-information values of a second portion containing the remaining pixels of the respective polygon surface are then interpolated from the previously-calculated image-information values of the first portion of pixels, which requires a significantly smaller calculating effort than the complex calculation according to the local illumination model, and thus advantageously results in a savings of calculation time.

In the above-discussed division of the polygon surface into scanlines, the interpolation can be effected one-dimensionally over the pixels of one scanline. The image-information values can then be calculated in the individual scanlines for every second, third or fourth pixel, for example, according to the local illumination model, and interpolated for the pixels between them. The image-information values can be interpolated in linear fashion from the image-information values of the two directly-adjacent pixels, but it is also possible to use polynomials of a higher order for interpolation when incorporating a plurality of adjacent pixels as support locations, for which splines are suitable.

According to another embodiment of the invention, there is a variation of the spacing of the pixels serving as support locations for the interpolation within the polygon surface to adapt the calculation effort to the complexity of the respective image contents. Hence, an interpolation employing few support locations also yields good results if the image-information value changes only slightly, whereas a severe local fluctuation of the image-information value within the polygon surface requires a correspondingly high density of support locations for producing a natural image impression. In this variation of the invention, therefore, the local fluctuation of the image-information value is continuously detected, and the support-location density is adapted accordingly. If necessary, the support-location density is adapted through exact post-calculation of the image-information values of pixels that are actually provided for the interpolation, according to the local illumination model. Assuming a support-location spacing of, for example, 3 pixels in each dimension, this suffices to produce a natural image impression in a normal case. If, however, a large difference exists between the image-information values of two support locations, then the intermediate values are subsequently replaced by correctly-calculated image-information values, depending on the requirements regarding quality and time. The criterion for the post-calculation could also be dependent on the angle with respect to the primary beam direction and the material or spot exponents.

To minimize the amount of hardware, it can be advantageous to use only an assembly that can calculate only the image-information value of a single pixel to calculate the image-information values according to the local illumination model. Because, however, the image-information values of a plurality of pixels are required in the interpolation, in this variation of the invention, to permit a subsequent interpolation, it is provided to switch an intermediate memory downstream of the third assembly of the calculation unit, the memory receiving the image-information values.

A so-called cache having a plurality of storage locations for receiving the image-information values of respectively one pixel, and having a plurality of outputs for simultaneously outputting a plurality of image-information values that are calculated in quick succession, is advantageously suited for the above-described, one-dimensional interpolation over the pixels of a respective scanline. The image-information values are then interpolated by a fifth assembly, which is connected on the input side to the cache and receives, for example, the image-information values of the (i)th and the (i+2)th pixels of a respective scanline, and uses them to perform a linear interpolation of the image-information value of the (i+1)th pixel. In a simple embodiment, it is also possible to switch a plurality of FIFO memories one behind the other for intermediate storage of the image-information values.

In another embodiment of the invention, the image-information values are not interpolated one-dimensionally over the pixels of a respective scanline, but two-dimensionally, in that the pixels of adjacent scanlines are also taken into account in the interpolation. This can lead to an improvement in the interpolation results and the image quality, or can be used to reduce the calculation effort, because adjacent lines are calculated in their entirety through interpolation.

In another embodiment of this variation, a plurality of scanlines are simultaneously processed for permitting a two-dimensional interpolation, for which a parallel arrangement that includes a plurality of so-called pipelines is suited, with each pipeline containing an assembly that calculates the image-information values of a respective pixel according to the local illumination model.

In yet another embodiment of this variation, the image-information values of certain pixels are stored, the values having been calculated according to the local illumination model, in an intermediate memory to permit a subsequent interpolation over the pixels of a plurality of scanlines.

The above-described interpolation of the image-information values of a plurality of pixels reduces the number of pixels for which the image-information value must be calculated in a complicated manner according to the local illumination model, which leads to a reduction in the calculation effort. The calculation effort in calculating the image impression of an object is, however, not only a function of the number of pixels for which image-information values must be calculated or interpolated, but is also influenced by the number of light sources illuminating the objects. In an advantageous variation of the invention, therefore, it is provided to reduce the calculating effort by alternatingly taking into consideration only a portion of the light sources in calculating the image-information values in the individual pixels according to the local illumination model. The influence of the light sources that are not considered in a pixel is then determined through interpolation of the image-information values of adjacent pixels, which consider other sources in the calculation according to the local illumination. Therefore, in a one-dimensional interpolation along a respective scanline, and with a total of four light sources, for example, it is possible that the first and second light sources are considered in the calculation of the local illumination model in the even-numbered pixels, while the influence of the first and second light sources in the odd-numbered pixels is determined through interpolation. The third and fourth light sources are then considered in the calculation of the local illumination model in the odd-numbered pixels, while the influence of the third and fourth light sources is interpolated in the even-numbered pixels. The consideration of different light sources in calculating the local illumination model in the individual pixels is not, however, limited to the aforementioned one-dimensional interpolation, but can also be applied in a two-dimensional interpolation. It is also possible to divide the present light sources into more than two groups. For example, in a two-dimensional interpolation, a first and a second group of light sources can be considered alternatingly in the one scanline, and a third and a fourth group of light sources can be considered alternatingly in the next scanline.

In the above-described embodiments of the invention, all of the light sources are considered in the calculation of the image-information values of the pixels, with the calculation of the image-information values being effected according to the local illumination model or through interpolation of the image-information values of adjacent pixels. The intensity of the light sources can, however, vary greatly in the different pixels. On the one hand, the intensity of a light source that can be perceived at the location of a pixel attenuates with the distance between the light source and the pixel, which is referred to as distance attenuation. On the other hand, the intensity of a light source at the location of a pixel is influenced by the position of the pixel relative to the primary beam direction of the light source, which is referred to as spotlight attenuation. Furthermore, the perceptible light source intensity is also a function of the angle between the reflected light vector and the eye vector (the vector between the viewer and the pixel). There are also different illumination models that are dependent on other factors. The calculation effort for considering a light source according to the local illumination model is therefore only worthwhile if the light source is still sufficiently bright at the location of the pixel, despite distance and/or spotlight attenuation. In a digital graphics system in which the resolution of the color or brightness values is 8 bits, a light source is regarded as invisible by the system if the intensity of the light source falls below $1/256$ of the maximum value. Below this limit value, a complicated consideration of the light source in the local illumination model is thus useless. It has been seen in practice that light sources whose brightness is only slightly above this numerically-dictated resolution limit, or that are screened by other, substantially more intense light sources, are irrelevant.

In a refining variation of the invention, it is therefore provided to calculate the intensity of the individual light sources and only consider the light sources whose intensity exceeds a predetermined limit value in the complex calculation of the local illumination model. The calculation of the intensity of the individual light sources can be effected individually for each pixel; it is, however, also possible to calculate the intensity for only each scanline or for only each polygon surface, which is permissible if the expansion of the polygon surface or the expansion of the scanline is significantly less than the distance from the next light source.

The intensity can be calculated based solely on the distance attenuation, or can include the spotlight attenuation. The distance attenuation can be calculated simply, with the assumption of an intensity that attenuates quadratically with the distance, using the spatial coordinates of the respective light source and the spatial coordinates of the respective pixel or the reference point on the scanline or polygon surface. The spotlight attenuation, in contrast, results from the angle between the primary beam direction of the respective light source and the connecting line between the light source and the pixel, or the reference point on the scanline, or the polygon surface.

In the above-described embodiment of the invention, the intensity is preferably calculated individually for each pixel; the attenuations of all light sources need to be calculated. To reduce the calculation effort in determining the relevant light sources, the attenuation of the individual light sources is calculated only once or twice in each scanline, for example, rather than individually for each pixel. Based on this calculation, a list of the relevant light sources and a list of the irrelevant light sources are composed; these lists are carried along the scanline, and are continuously updated. The attenuations of all of the light sources are not re-calculated in this continuous updating; instead, only the attenuations of the light sources designated as relevant are updated. If one of the light sources designated as relevant falls below the predetermined limit value for minimum brightness, this light source is crossed off the list of relevant light sources, and is no longer considered within the same scanline. Moreover, the attenuation of the light source at the top of the irrelevant list is calculated exactly. If the brightness of this light source exceeds the predetermined limit value, this light source is added to the list of relevant light sources, and subsequently considered in the same scanline in the calculation of the local illumination model. Conversely, if the brightness of the light source at the top of the list of irrelevant light sources falls below the predetermined limit value, this light source is placed at the bottom of the list of irrelevant light sources. In this way, light sources whose attenuation is less within a scanline are added to the list of relevant light sources and are considered correspondingly. Calculation effort is saved because the calculation of the attenuation in each pixel is only effected for the light sources designated as relevant, and for the light source at the top of the irrelevant list.

The above-described method of handling the list of irrelevant light sources only represents one of numerous possibilities. The ultimate goal is to "scan" the light sources from the list of irrelevant light sources so that, if possible, it is determined timely when a light source becomes relevant again.

In the above-described embodiments of the invention, the image-information value is calculated for certain pixels according to the local illumination model used, while the image-information values of the remaining pixels are interpolated. The invention is not, however, limited to dividing the pixels into groups for calculation or interpolation; it is also possible to break down the calculation according to the local illumination model into a plurality of calculation steps. Thus, the image-information value is usually calculated from a summation of the light components of one or a plurality of light sources. In a refining variation of the invention, the individual addends of the calculation formula are divided into two groups, of which one is calculated and the other is interpolated. The image-information value determined in this manner then comprises interpolated and calculated components.

The above-described embodiments of the invention permit a reduction in the calculation effort in displaying computer-modeled objects, because the image-information values are calculated for only a portion of the pixels according to the local illumination model, while the image-information values of the remaining pixels must subsequently be determined through interpolation of the previously-calculated image-information values or, if there is no relevance, they need not be calculated at all. In addition to this spatial correlation of the image-information values, in representing a moved image, it is also possible to perform a temporal correlation of the image-information values. In this variation, the invention makes use of the knowledge that the illumination situation rarely changes between images (frames) that are adjacent in time, so it suffices to calculate precisely the relevance of the individual light sources for only every third frame, for example, and retain it in the display of the frames located between them in time.

As described above, the body or surface intended to be shown on the screen is simulated in the computer as a grid model. The surface therefore comprises numerous polygon surfaces whose spatial position is defined by the spatial coordinates of the node points of the grid model. In an advantageous embodiment of the invention, triangles are used as polygon surfaces. This means that three points are connected by edges in the grid model. The use of triangles for modeling the surfaces has the advantage that the surface normal of a triangle is unambiguously defined by the spatial coordinates of the corner points, because three points always lie in one plane, while in polygons having more than three corner points, the corner points need not lie exactly in one plane, so the surface normal is not defined exactly.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

Figure 1:
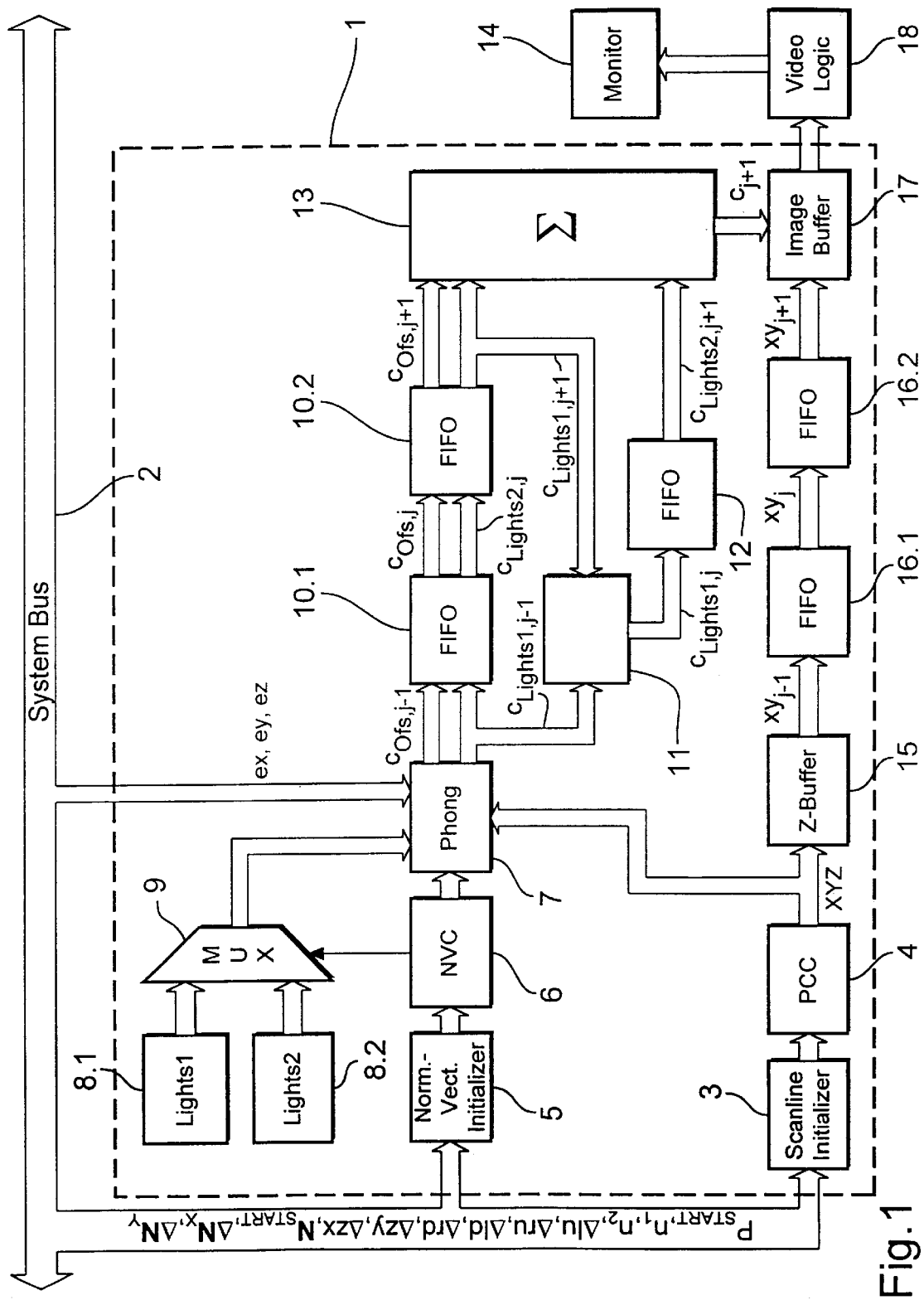
FIG. 1 shows, as a preferred embodiment of the invention, a calculation unit for displaying computer-modeled objects, the unit being a component of a comprehensive computer-graphics system.

FIG. 1 shows a calculation unit 1 which permits a representation of computer-modeled objects and is a component of a comprehensive computer-graphics system, of which only a system bus 2 is shown. The individual objects are stored as grid models in the graphics system, and are defined by the spatial coordinates of the node points of the grid model and the optical properties of the triangular polygon surfaces lying between the node points—for example, the color and the reflection properties.

The illustrated calculation unit 1 consecutively calculates the image impressions of all of the polygon surfaces of the individual objects, with the spatial position and the surface properties of the respective polygon surface, the desired perspective and the illumination situation being predetermined by the graphics system via the system bus 2. From the graphics system, the calculation unit 1 obtains a parameter set, via the system bus 2, for each polygon surface to be shown, the set representing the spatial position and the optical properties of the respective polygon surface, and the unit permits a fine division of the polygon surface into a plurality of pixels that are respectively disposed in scanlines. Thus, the parameter set includes the spatial coordinates ($x_s$, $y_s$, $z_s$) of a corner point $P_{Start}$ of the triangle, the edge increments $\Delta lu$, $\Delta ru$, $\Delta ld$, $\Delta rd$, the number of scanlines $n_1$, $n_2$ of the triangle, and the inclination $\Delta zx$ of the triangle surface with respect to the X axis and the inclination $\Delta zy$ of the triangle surface with respect to the Y axis. The parameter set further includes the coordinates of the local surface normal $N_{Start}$ in the predetermined corner point and the vector increments $\Delta N_x$, $\Delta N_y$, which permit a calculation of the local surface normal in each pixel of the triangle surface. The triangle surface is therefore not necessarily planar, but is usually curved. On the one hand, this permits an adaptation of the curve to a predetermined surface course of the objects. On the other hand, in this way it is possible to attain a smooth and therefore visually inconspicuous transition at the edges between adjacent triangle surfaces. The parameter set also includes information about the color of the triangle surface, the absorption behavior, the transparency of the triangle surface and the like.

Figure 2A:
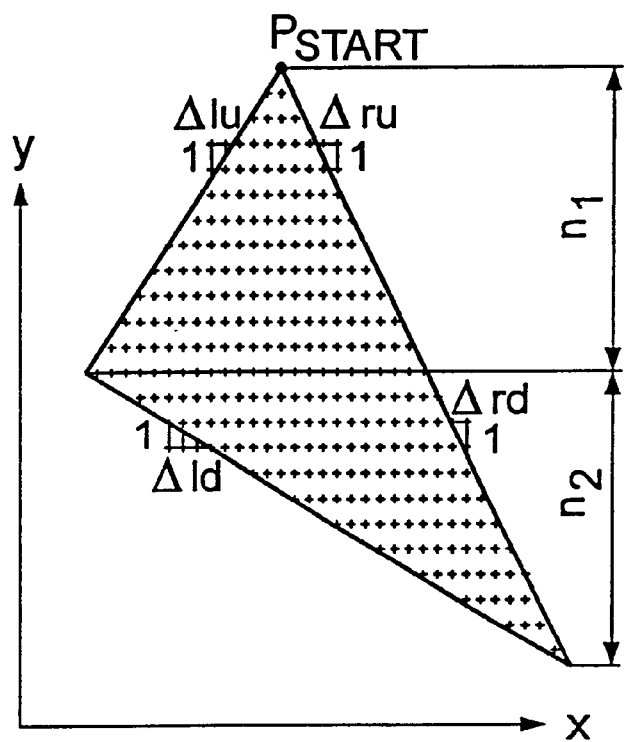
FIGS. 2a, 2b show, as an example, a polygon surface of a computer-modeled object for explaining the division of the polygon surface into scanlines and pixels.
Figure 2B:
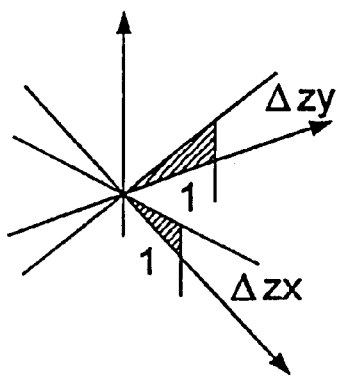

In the calculation unit 1, the parameter set produced by the superordinate graphics system is supplied to, among other components, an assembly 3 (scanline initializer), which first divides the triangle surface into a plurality of scanlines and calculates the spatial coordinates of the initial point ($x_1$, $Y_1$, $z_1$) and the end point ($x_r$, $y_r$, $z_r$) for each scanline. FIGS. 2a and 2b show this type of triangle surface for explaining the division into pixels. The individual scanlines are disposed parallel to the X axis and equidistantly from one another, so the Y coordinate of all pixels of a scanline is the result of the Y coordinate $y_s$ of the predetermined corner point $P_{Start}$ and the number i of the scanline. Thus, the following applies for the Y coordinates of the initial point and the end point of the individual scanlines:

$y_1 = y_s + i$  $y_r = y_s + i$.

The X coordinate $x_1$ of the initial point of each scanline correspondingly results from the X coordinate $x_s$ of the predetermined starting point $P_{Start}$, the number i of the scanline and the edge increment $\Delta lu$ or $\Delta ld$. The edge increment $\Delta lu$ is used within the first $n_1$ scanlines and, subsequently, the edge increment $\Delta ld$ is used.

$x_1 = x_s + \Delta lu \cdot i$ for $i \leq n_1$.

$x_1 = x_s + \Delta lu \cdot n_1 + (i - n_1) \cdot \Delta ld$ for $n_1 < i \leq n_1 + n_2$ In the same way, the X coordinate $x_r$ of the end point of each scanline results from the X coordinate $x_s$ of the starting point $P_{Start}$, the number i of the scanline and the edge increment $\Delta lu$ or $\Delta rd$. The edge increment $\Delta ru$ is used during the first $n_1$ scanlines and, subsequently, the edge increment $\Delta rd$ is used:

$x_r = x_s + \Delta ru \cdot i$ for $i \leq n_1$ $x_r = x_s + \Delta ru \cdot n_1 + (i - n_1) \cdot \Delta rd$ for $n_1 < i \leq n_1 + n_2$.

The Z coordinate $z_1$ of the initial point of each scanline results from the Z coordinate $z_s$ of the starting point $P_{Start}$, the number i of the scanline and the predetermined inclinations of the triangle surface with respect to the X axis and the Y axis:

$z_1 = z_s - i \cdot \Delta zy + (x_1 - x_s) \cdot \Delta zx$.

The assembly 3 then transmits the predetermined inclination value $\Delta zy$ of the triangle surface and the coordinates of the initial point ($x_1$, $y_1$, $z_1$) and the end point ($x_r$, $y_r$, $z_r$) for each scanline to a downstream assembly 4 (PCC—Pixel Coordinate Calculator), which divides the individual scanlines into a plurality of pixels and calculates their coordinates. Because the scanlines extend parallel to the X axis, the Y coordinate of each pixel is identical to the Y coordinate of the associated scanline:

$y_j = y_1$.

The X coordinate of each pixel results from the X coordinate $x_1$ of the initial point of the scanline and the number j of the pixel in the scanline:

$y_j = x_1 + j$.

The Z coordinate of a pixel can be calculated simply from the Z coordinate $z_1$ of the initial point of the associated scanline, the number j of the pixel within the scanline and the inclination $\Delta zx$ of the triangle surface relative to the X axis:

$z_j = z1 + j \cdot \Delta zx$.

The assembly 4 thus calculates the coordinates for each pixel of the polygon surface, which is a prerequisite for a later calculation of the image impression according to a local illumination model.

The parameter set produced by the superordinate graphics system and representing the spatial position of a respective triangle is further supplied to an assembly 5 (normal vector initializer), which calculates the components ($xn_1$, $yn_1$, $zn_1$) of the normal vector $N_1$ at the initial point of each scanline. For this purpose, the received parameter set includes the components ($xn_s$, $yn_s$, $zn_s$) of the normal vector $N_s$ at the predetermined corner point $P_{Start}$ and the vector increments $\Delta N_x = (\Delta xn_x, \Delta yn_x, \Delta zn_x)$ and $\Delta N_y = (\Delta xn_y, \Delta yn_y, \Delta zn_y)$. The vector increment $\Delta N_y$ determines the change in the normal vector in the transition to the respectively next scanline, while the vector increment $\Delta N_x$ determines the change in the normal vector between two pixels of a scanline.

The normal vector at the initial point of a scanline is calculated from the predetermined normal vector $N_{Start}$ at the predetermined corner point $P_{Start}$ of the triangle, the X coordinate $x_1$ of the initial point of the scanline and the vector increments $\Delta N_x$, $\Delta N_y$ and the number i of the scanline:

$$N_{li} = N_{Start} + i\Delta N_y + (x_1 - x_{Start})\Delta N_x$$

or, written in terms of components:

$$xn_1 = xn_s + i\Delta xn_y + (x_1 - X_{Start})\Delta xn_x$$

$$yn_1 = yn_s + i\Delta yn_y + (x_1 - X_{Start})\Delta yn_x$$

$$zn_1 = zn_s + i\Delta zn_y + (x_1 - X_{Start})\Delta zn_x$$

The assembly 5 then transmits the components of the normal vector at the initial point of the scanline, as well as the vector increment $\Delta N_x$ for each scanline, to a downstream assembly 6 (NVC—Normal Vector Calculator), which calculates the local surface normal for each pixel within the current scanline, the normal resulting from the normal vector $N_{li}$ at the initial point of the scanline, the number j of the pixel within the scanline and the vector increment $\Delta N_x$ according to the formula $$N = N_{li} + j\Delta N_x$$

or, written in terms of components, $$xn = xn_1 + j\Delta xn_x$$

$$yn = yn_1 + j\Delta yn_x$$

$$zn = zn_1 + j\Delta zn_x$$

The coordinates of a scanline that have been calculated by the assembly 4 and the components of the normal vector determined by the assembly 6 at the location of the respective pixel are then supplied to a further assembly 7, which calculates the image impression of the respective pixel according to a local illumination model. In addition to the information about the spatial position and the orientation of the respective pixel, the assembly 7 also requires information about the illumination situation and the desired perspective.

The illumination situation is determined by the spatial position and the primary beam direction of a plurality of virtual light sources, with the data of one portion of the light sources being stored in a first storage element 8.1, and the data of the remaining light sources being stored in a second storage element 8.2. The division and separate storage of the light sources serve to reduce the calculation effort because, in each pixel, either only the first portion of the light sources or only the second portion of the light sources is considered according to the local illumination model. The influence of the light sources that are not considered in a pixel is determined later, as will be described below, through interpolation of the image-information values of the adjacent pixels. The light sources to be considered are selected by a multiplexer 9, which is triggered by the assembly 6 for each new pixel, and further conducts the light-source data stored in either the one storage element 8.1 or the other storage element 8.2, so the assembly 7 alternatingly obtains the data of the first and second groups of light sources for consideration in the local illumination model.

The assembly 7 receives from the superordinate graphics system, via the system bus 2, a parameter set $e_x$, $e_y$, $e_z$, which determines the position of a virtual viewer and thus the desired perspective.

Figure 3:
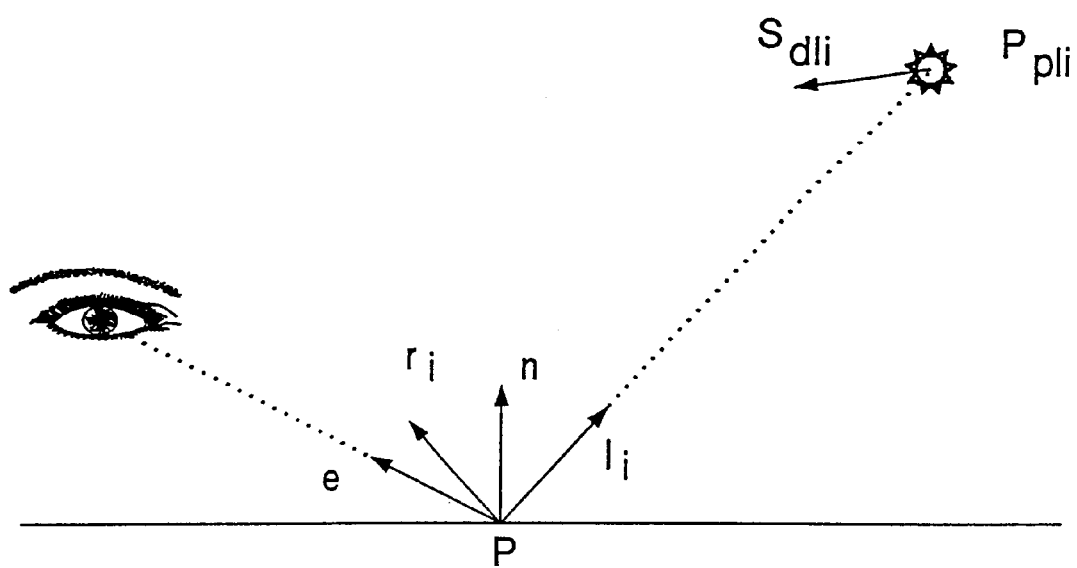
FIG. 3 shows a schematic representation of the illumination situation of a pixel for explaining the local illumination model.

The assembly 7 calculates the image impression of the respective pixel separately for the three primary colors red, green and blue of the RGB color model, according to Phong's illumination model shown schematically in FIG. 3, which uses the formula $$c = e_{cm} + a_{cm} \cdot a_{cs} + \sum_{i=0}^{n-1}(att_i)(spot_i)\left[a_{cm} \cdot a_{cli} + (\vec{n} \cdot \vec{l}_i)d_{cm} \cdot d_{cli} + (\vec{r}_i \cdot \vec{e})^{S_{rm}} s_{cm} \cdot s_{cli}\right] \Leftrightarrow$$

$$c = c_{0\mathit{fs}} + \sum_{i=0}^{n-1} light_i$$

with

| | |
|---|---|
| c | color impression of the respective pixel, |
| i | number of the respective light source, |
| n | number of light sources, |
| $c_{Ofs} = e_{cm} + a_{cm} \cdot a_{cs}$ | light-source-independent compoment, |
| $e_{cm}$ | emissive color of the material, |
| $a_{cm}$, $d_{cm}$, $s_{cm}$ | ambient, diffuse and specular color, respectively, of the material, |

$$light_i = (att_i)(spot_i)\left[a_{cm} \cdot a_{cli} + (\vec{n} \cdot \vec{l}_i)d_{cm} \cdot d_{cli} + (\vec{r}_i \cdot \vec{e})^{S_{rm}} s_{cm} \cdot s_{cli}\right]$$

component of the ith light source, $$att_i = \frac{1}{k_{0i} + k_{1i}\|\vec{l}_i\| + k_{2i}\|\vec{l}_i\|^2}$$

distance attenuation of the ith light source, $$spot_i = \left\{-\left(\vec{l}_i \cdot \vec{s}_{dli}\right)_0^{S_{rli}}\right.$$

pixel within the cutoff angle $c_{rli}$ otherwise spotlight attenuation of the ith light source,

| | |
|---|---|
| $s_{rm}$ | specular exponent of the material, |
| $a_{cli}$, $d_{cli}$, $s_{cli}$ | ambient, diffuse and specular color, respectively, of the light source i, |
| $P_{pli}$ | position of the light source i, |
| $s_{dli}$ | primary beam direction of the light source i, |
| $s_{rli}$ | spotlight exponent of the light source i, |
| $c_{rli}$ | spotlight cutoff angle of the light source i, |

-continued

| $k_{0i}, k_{1i}, k_{2i}$ | constant, linear and quadratic distance attenuation, respectively, of the light source i, |
|---|---|
| $a_{cs}$ | ambient color of the scene. |

Taking into consideration of the division of the light sources into two groups of light sources "Lights1" and "Lights2," the color is calculated from the above equations:

$$c = c_{Ofs} + \sum_{i=0}^{n-1} light_i = c_{Ofs} + \sum^{Lights1} light_i + \sum^{Lights2} = c_{Ofs} + c_{Lights1} + c_{Lights2}$$

The assembly 7 calculates only the light-source-independent component $c_{Ofs}$ for each pixel, and the component $c_{Lights1}$ or $c_{Lights2}$ for the light-source data supplied from the multiplexer 9. The component $c_{Lights1}$ or $c_{Lights2}$ which results from the data of the other light-source groups, is subsequently considered through interpolation.

For this purpose, the color or brightness values $c_{Ofs}$ and $c_{Lights1}$, or $c_{Lights2}$ are supplied to two FIFO (First In, First Out) memories 10.1, 10.2 switched one behind the other, so the color values $c_{Lights1}$ or $c_{Lights2}$ of multiple cycle steps j−1, j and j+1, the values having been calculated previously by the assembly 7, are available for interpolation in the calculation unit 1, with each cycle step being associated with a pixel.

FIG. 1 shows the status of the calculation unit for even-numbered cycle steps j. In this case, the light-source-independent component $c_{Ofs,j}$ and the component $c_{Lights2,j}$ of the second light-source group for the cycle j appear at the output of the FIFO memory 10.1. The component $c_{Lights1,j}$ of the first light-source group is determined through interpolation for this cycle step. The color-value component $c_{Lights1,j+1}$ of the previous cycle step j+1 and the color-value component $c_{Lights1,j-1}$ of the next cycle step j−1 are supplied to a calculation unit 11, which uses them to interpolate the color-value component $c_{Lights1,j}$ for the cycle j according to the formula $$c_{Lights1,j} = \frac{1}{2} \cdot (c_{Lights1,j-1} + c_{Lights1,j+1}),$$

then writes it into a FIFO memory 12. In the next cycle step j+1, the color-value components $c_{Ofs,j+1}$ and $c_{Lights2,j+1}$ in intermediate storage in the FIFO memory 10.2, and the color-value component $c_{Lights1,j+1}$ stored in the FIFO memory 12 are pushed out and supplied to an adder 13, which uses them to calculate the final color value $c_{j+1}$ according to the formula $$c_{j+1} = c_{Ofs,j+1} + c_{Lights1,j+1} + c_{Lights2,j+1}$$

In the odd-numbered cycle steps j, in contrast, the light-source-independent color-value component $c_{Ofs,j}$ and the component $c_{Lights1,j}$ of the first light-source group appear at the output of the FIFO memory 10.1, while the component $c_{Lights2,j}$ is interpolated.

To display an image on a monitor 14, it is also necessary to convert the three-dimensional coordinates of the individual pixels into a two-dimensional screen-coordinate system that indicates the position of the respective pixel on a screen. The coordinates calculated by the assembly 4 are therefore supplied to an assembly 15, also called a Z filter, which suppresses the pixels that are hidden and are therefore not visible, and only further conducts the screen coordinates of the visible pixels.

The screen-coordinate set is subsequently pushed through two FIFO memories 16.1, 16.2 switched one behind the other, and is thus delayed by two calculating cycles for compensating the delay through the interpolation of the image-information values.

The screen-coordinate set serves in addressing a screen memory 17, which receives the image-information values c of the individual pixels from the adder 13.

Following the calculation of all of the pixels of all polygon surfaces, the screen memory 17 contains a view in perspective of the virtual spatial scene. This image is then reproduced by a screen drive circuit 18 connected on the input side to the screen memory 17, and the monitor 14.

Figure 4:
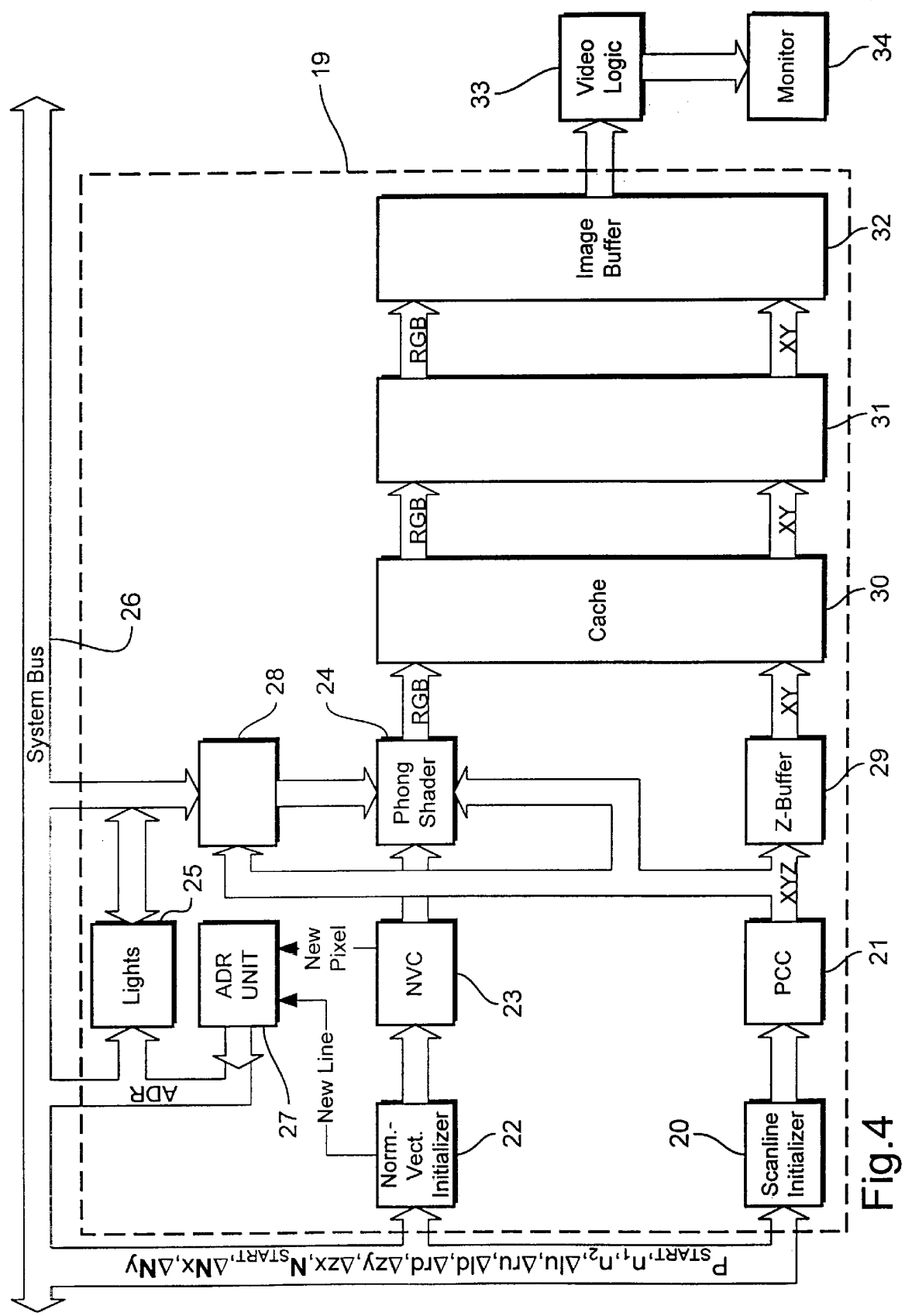
FIG. 4 shows a further embodiment of a calculation unit of the invention for displaying computer-modeled objects.

FIG. 4 also shows a calculation unit 19, which, being a component of a comprehensive graphics system, permits a display of computer-modeled objects present in the form of a grid model. As in the calculation unit shown in FIG. 1 and described above, the superordinate graphics system supplies a parameter set to the calculation unit 19, the set defining, among other things, the spatial position and the optical properties (color, reflection behavior, etc.) of a respective polygon surface. Using the received parameter set, the illustrated calculation unit 19 then divides the respective polygon surface into a plurality of scanlines and, by means of an assembly 20, calculates the coordinates of the initial point and the end point for each scanline. Each scanline is then divided into a plurality of pixels whose coordinates are calculated by a further assembly 21 in the above-described manner. Moreover, the parameter set supplied by the superordinate graphics system is supplied to a further assembly 22, which first calculates the local surface normal at the initial point of the scanline. A downstream assembly 23 then calculates the local surface normal for each pixel within the polygon surface, so the image impression of each pixel can subsequently be calculated by an assembly 24 according to a local illumination model.

Figure 5:
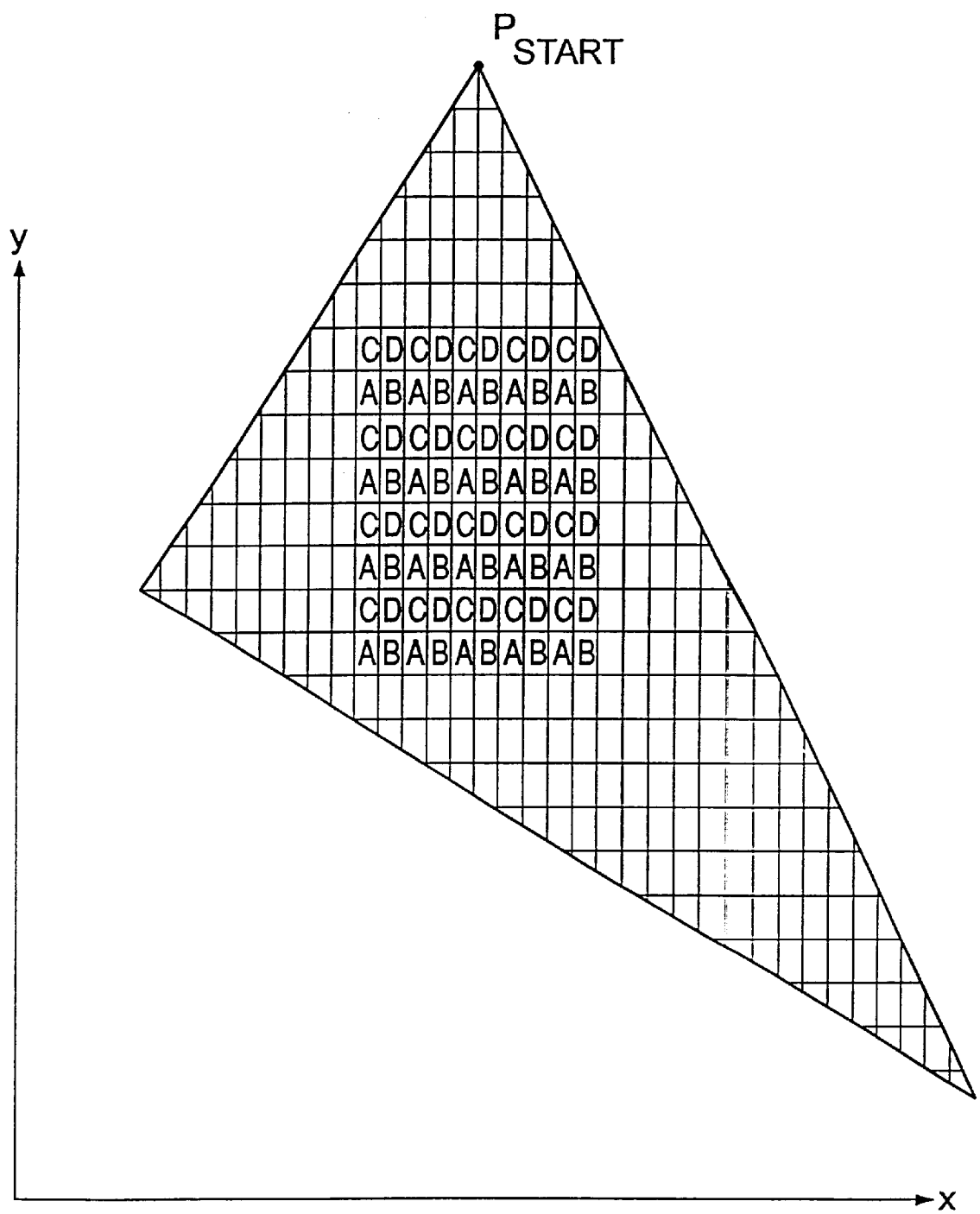
FIG. 5 shows a polygon surface in which different groups of light sources are considered in the individual pixels for saving calculation time.

The illumination situation is predetermined by the superordinate graphics system and stored in a storage element 25. To this end, the calculation unit 19 receives, via a bus 26, the coordinates of the individual light sources, the respective primary beam direction and intensity and color of the individual light sources, and stores these data in the storage element 25. For reducing the calculation effort in calculating the local illumination model, only a portion of the light sources selected as a function of the position of the respective pixel is considered in each pixel. The light source is selected by an addressing unit 27 that obtains a control pulse from the assembly 22 or 23 at the beginning of each scanline and for each new pixel. The addressing unit 27 thus changes the selection of the light sources to be considered for each pixel. Furthermore, in each new scanline, different light sources are considered with respect to the previous scanline. The light sources are divided into four groups A, B, C, D. In the odd-numbered scanlines, the light sources of group A are considered in the even-numbered pixels, and the light sources of group B are considered in the odd-numbered pixels. In contrast, in the even-numbered scanlines, the light sources of group C are considered in the even-numbered pixels, and the light sources of group D are considered in the odd-numbered pixels, as shown by way of example in FIG. 5.

The calculation effort is further reduced by the consideration of only the light sources whose intensity does not fall below a predetermined limit value at the location of the respective pixel. For this purpose, a further assembly 28 is provided that is connected on the input side to the storage element 25 and receives the data of all of the light sources that were selected by the addressing unit 27 for the respective pixel. Moreover, this assembly 28 is connected to the assembly 21 that calculates the coordinates of the individual pixels. The assembly 28 then calculates, on the one hand, the distance attenuation resulting directly from the distance between the respective light source and the pixel, and increasing quadratically with the distance. If the distance attenuation exceeds the predetermined limit value, the respective light source is not considered in the calculation of the local illumination model. On the other hand, the so-called spotlight attenuation is calculated, which is based on the fact that the perceived intensity of a light source decreases as the distance from the primary beam direction increases. The assembly 28 therefore calculates the angle between the primary beam direction of the individual light sources and the connecting line between the respective light source and the pixel. If this angle exceeds a predetermined limit value, the spotlight attenuation is too great, and the light source is not considered in the calculation of the local illumination model.

Therefore, the image-information values of the pixels resulting from the relevant perspective and the predetermined illumination situation according to the local illumination model appear at the output of the assembly 24.

The calculation unit 19 further includes an assembly 29 that is also referred to as a Z buffer, and suppresses the hidden pixels, thereby only further conducting the screen coordinates of the visible pixels. These screen-coordinate sets serve to actuate an intermediate memory 30 ("cache") in which the image-information values calculated by the assembly 24 are stored.

As described in detail above, only a portion of the light sources is considered in the calculation of the individual image-information values, so the contents of the intermediate memory 30 only approximately reflect the correct image impression. The calculation unit 19 therefore has a further assembly 31, which is disposed downstream of the intermediate memory 30 and interpolates the image-information values stored in the intermediate memory 30, so that all of the relevant light sources are considered in each pixel or in each storage location of the intermediate memory 30. For each pixel, the assembly 31 reads out the image-information values of the adjacent pixels of the same scanline, and the image-information values of the adjacent pixels in the immediately-adjacent scanlines, and uses them in an interpolation to calculate an improved image-information value that now takes into consideration the influence of all of the light sources. The assembly 31 then writes the image-information values into the screen memory 32, and they are displayed via a screen drive circuit 33 and a screen 34.

It will be understood that the above description of the present invention is susceptible to various modifications, changes and adaptations, and the same are intended to be comprehended within the meaning and range of equivalents of the appended claims.

What is claimed is:

1. An imaging method for displaying computer-modeled objects that are present in the form of a grid model and are simulated by a plurality of adjacent polygon surfaces, comprising the steps of: using a first assembly of a calculation unit to calculate a plurality of first coordinate sets from a first parameter set that respectively represents the spatial position of one of the polygon surfaces, the coordinate sets respectively representing the spatial position of a pixel of the respective polygon surface; using a second assembly of the calculation unit that uses the first parameter set representing the spatial position of the polygon surface to calculate a second coordinate set for each pixel of the polygon surface, which set represents the spatial position and direction of the local surface normal; using a third assembly of the calculation unit that uses a second parameter set representing the spatial position and the optical properties of at least a first light source, as well as the first coordinate sets representing the spatial position of the individual pixels, and the second coordinate sets representing the spatial position of the local surface normals, to calculate image-information values according to a local illumination model, the values representing the image impression of a respective pixel; using a fourth assembly of the calculation unit that uses the first coordinate set representing the spatial position of the respective pixel to calculate a two-dimensional screen-coordinate set for each pixel for display on the screen, which set determines the position of the pixel of the screen; selecting a first portion from all of the pixels of the respective polygon surface, and calculating in the third assembly the image-information values for all of the pixels of the first portion according to the local illumination model or a portion of the local illumination model; and subsequently using in a fifth assembly the image-information values that have been calculated for the first portion of pixels to interpolate the image-information values for a second portion of pixels that includes the remaining pixels of the polygon surface.

2. The method according to claim 1, wherein the image-information values in each pixel comprise an interpolated component and a component that has been calculated according to the local illumination model, with the light sources that were respectively defined by the second parameter set being considered in the first portion of the pixels through the calculation of the local illumination model, and the light sources that were defined by a third parameter set being considered through interpolation, and with the light sources that were defined by the second parameter set being considered in the second portion of the pixels through interpolation and the light sources that were defined by the third parameter set being considered through the calculation of the local illumination model.

3. The method according to claim 1, wherein the pixels are disposed in scanlines within the individual polygon surfaces.

4. The method according to claim 3, wherein the pixels of the individual scanlines are alternatingly associated with the first and second portions.

5. The method according to claim 1, wherein the image-information value of a pixel of a scanline is interpolated from the image-information values of at least two adjacent pixels of the same scanline, the values having been calculated according to the local illumination model or a portion of the local illumination model.

6. The method according to claim 1, wherein the image-information value of a pixel of a scanline is interpolated from the image-information values of at least two adjacent pixels of the same scanline, the values having been calculated according to the local illumination model or a portion of the local illumination model, and from the image-information values of at least two adjacent pixels in adjacent scanlines, the values having been calculated according to the local illumination model or a portion of the local illumination model.

7. The method according to claim 1, wherein the image-information values of the pixels of a plurality of scanlines that have been calculated according to the local illumination value are stored in an intermediate memory following the calculation, and are subsequently read out of the intermediate memory for the interpolation of the image-information values of the other pixels.

8. The method according to claim 1, wherein a sixth assembly of the calculation unit determines, individually for each pixel or each scanline or each polygon surface, the second parameter set representing the spatial position and the optical properties of at least the first light source, and/or the third parameter set representing the spatial position and the optical properties of at least the second light source, by using a fourth parameter set representing the spatial position and the optical properties of a plurality of light sources, with the sixth assembly calculating the distance attenuation and/or the spotlight attenuation for the individual light sources, and selecting the light sources that have the least attenuation at the location of the pixel or scanline or polygon surface.

9. The method according to claim 8, wherein the sixth assembly calculates the distance attenuation and/or the spotlight attenuation once in each scanline for all of the light sources, and divides the light sources into relevant and irrelevant light sources, depending on the calculated distance attenuation and/or the spotlight attenuation, wherein in each pixel, the sixth assembly calculates the distance attenuation and/or the spotlight attenuation for all of the relevant light sources, and classifies the light sources as irrelevant if a limit value for the distance attenuation and/or the spotlight attenuation is exceeded, and wherein, in each pixel, the sixth assembly, calculates the distance attenuation and/or the spotlight attenuation for one of the irrelevant light sources, and classifies this light source as relevant if a predetermined limit value for the distance attenuation and/or the spotlight attenuation is not met.

10. The method according to claim 8, wherein the second parameter set representing the spatial position and the optical properties of at least the first light source and/or the third parameter set representing the spatial position and the optical properties of at least the second light source is or are calculated from the fourth parameter set representing the spatial position and the optical properties of a plurality of light sources in the display of a moved image, depending on a predetermined number of image changes, with the first parameter set and/or the second parameter set being stored in a storage element for access by the third assembly between the updated calculations.

11. The method according to claim 1, wherein the image-information values of the second portion of the pixels are interpolated by a polynomial from the image-information values of a plurality of pixels of the second portion.

12. The method according to claim 1, wherein the difference in the image-information values is calculated for adjacent pixels of the first portion of the pixels, and compared to a predetermined limit value, and wherein, if the calculated difference in image-information values is exceeded, the image-information value for at least one pixel of the second portion of the pixels is calculated according to the local illumination value.

13. An apparatus for displaying computer-modeled objects that are present in the form of a grid model and are simulated by a plurality of adjacent polygon surfaces, particularly for executing the imaging method according to one of the foregoing claims, comprising an input for receiving a first parameter set representing the spatial position of one of the polygon surfaces, and a second parameter set representing the spatial position and the optical properties of at least a first light source, a calculation unit connected to the input of a first assembly for calculating a plurality of first coordinate sets that represent the spatial position of a pixel of the respective polygon surface, a second assembly for calculating the second coordinate sets representing the spatial position of the local surface normals in the individual pixels as a function of the first parameter set, a third assembly for calculating the image-information values that respectively represent a pixel, according to a local illumination model, as a function of the first parameter set representing the spatial position of the first light source, and the first coordinate set representing the spatial position of the respective pixel, and the second coordinate set that represents the spatial position of the local surface normal, and a fourth assembly for calculating a two-dimensional screen-coordinate set for each pixel from the first coordinate set representing the spatial position of the pixel, said calculation unit having a fifth assembly, which is connected on the input side to the third assembly for receiving the calculated image-information values, for interpolating image-information values of individual pixels from the image-information values of adjacent pixels, the values having been calculated according to the local illumination model.

14. The apparatus according to claim 13, wherein the third assembly of the calculation unit is connected on the output side to an intermediate memory for intermediate storage of the image-information values for the subsequent interpolation, the values having been calculated according to the local illumination model.

15. The apparatus according to claim 14, wherein the intermediate memory is a FIFO memory.

16. The apparatus according to claim 13, further comprising a sixth assembly for using a fourth parameter set representing the spatial position and the optical properties of a plurality of light sources to calculate, individually for each pixel, each scanline or each polygon surface, the second parameter set representing the spatial position and the optical properties of at least the first light source, and/or the third parameter set representing the spatial position and the optical properties of at least the second light source, the assembly calculating the distance attenuation and/or the spotlight attenuation for the light sources defined by the fourth parameter set, and selecting the light sources having the least attenuation at the location of the pixel, the scanline or the polygon surface.

* * * * *